(12) United States Patent
Seagraves et al.

(10) Patent No.: US 12,236,359 B2
(45) Date of Patent: Feb. 25, 2025

(54) OPTIMIZING AND PREDICTING AVAILABILITY OF RESOURCES IN A SHARED VEHICLE ENVIRONMENT

(71) Applicant: Ford Motor Company, Dearborn, MI (US)

(72) Inventors: Jamel Seagraves, Campbell, CA (US); Chih-wei Tang, Mountain View, CA (US); Sudipto Aich, Palo Alto, CA (US); Beaudry Kock, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 880 days.

(21) Appl. No.: 16/980,923

(22) PCT Filed: Mar. 16, 2018

(86) PCT No.: PCT/US2018/022844
§ 371 (c)(1),
(2) Date: Sep. 15, 2020

(87) PCT Pub. No.: WO2019/177620
PCT Pub. Date: Sep. 19, 2019

(65) Prior Publication Data
US 2020/0410375 A1    Dec. 31, 2020

(51) Int. Cl.
*G06N 5/04* (2023.01)
*B62H 3/00* (2006.01)
(Continued)

(52) U.S. Cl.
CPC .................. *G06N 5/04* (2013.01); *B62H 3/00* (2013.01); *B62H 5/00* (2013.01); *G01S 19/01* (2013.01);
(Continued)

(58) Field of Classification Search
CPC ...... G06N 5/04; G06N 20/00; G06F 16/9537; G06F 16/29; B62H 3/00; B62H 5/00;
(Continued)

(56) References Cited

U.S. PATENT DOCUMENTS 9,953,539 B1 *   4/2018   Gkiotsalitis ............ G06Q 10/04
10,032,368 B1 *   7/2018   Thompson ......... G06Q 30/0284
(Continued)

OTHER PUBLICATIONS

International Search Report of the International Searching Authority for PCT/US2018/022844 with mailing date of Jun. 6, 2018.

*Primary Examiner* — Jeremy L Stanley
(74) *Attorney, Agent, or Firm* — Emily Drake; Eversheds Sutherland (US) LLP (57) ABSTRACT

An intelligent bicycle sharing system, or other vehicle sharing system, is able to provide helpful bicycle availability predictions based on historical data, including various utilization statistics. Historical data can be collected over time as users use the bicycle sharing system. For example, the historical data may include the number of available bicycles at various locations and times, as well as contextual data associated with the locations and times. Contextual data may include data regarding the weather, local events, season, day of the week or year, news events, among other environmental factors that may or may not influence bicycle utilization. In some embodiments, a model, such as a machine learning model (e.g., neural network) may be trained using the historical data as training data such that the model can predict bicycle availability for a certain future time and location.

12 Claims, 8 Drawing Sheets

(51) Int. Cl.
  *B62H 5/00* (2006.01)
  *G01S 19/01* (2010.01)
  *G06F 16/29* (2019.01)
  *G06F 16/9537* (2019.01)
  *G06N 20/00* (2019.01)
  *G06Q 10/0631* (2023.01)
  *G06Q 30/0645* (2023.01)
  *G06Q 50/40* (2024.01)

(52) U.S. Cl.
  CPC .......... *G06F 16/29* (2019.01); *G06F 16/9537* (2019.01); *G06N 20/00* (2019.01); *G06Q 10/06315* (2013.01); *G06Q 50/40* (2024.01); *G06Q 30/0645* (2013.01); *G06Q 2240/00* (2013.01)

(58) Field of Classification Search
  CPC .. G01S 19/01; G06Q 10/06315; G06Q 50/30; G06Q 30/0645; G06Q 2240/00
  See application file for complete search history.

(56) References Cited

U.S. PATENT DOCUMENTS

| | | | | |
|---|---|---|---|---|
| 10,354,531 | B1* | 7/2019 | Bronder | G06F 16/29 |
| 10,453,341 | B2* | 10/2019 | Guseynov | G08G 1/144 |
| 10,459,444 | B1* | 10/2019 | Kentley-Klay | G05D 1/0027 |
| 11,168,995 | B2* | 11/2021 | Ludwick | B60L 53/66 |
| 11,386,789 | B1* | 7/2022 | Bajaj | G08G 1/202 |
| 2002/0019760 | A1* | 2/2002 | Murakami | G06Q 10/08 |
| | | | | 705/7.25 |
| 2003/0009279 | A1* | 1/2003 | Kawamoto | G01C 21/20 |
| | | | | 701/532 |
| 2010/0228405 | A1* | 9/2010 | Morgal | B62H 3/00 |
| | | | | 701/1 |
| 2012/0265434 | A1* | 10/2012 | Woodard | G08G 1/147 |
| | | | | 701/423 |
| 2013/0179383 | A1* | 7/2013 | Pringle | G06N 7/01 |
| | | | | 320/109 |
| 2014/0122190 | A1* | 5/2014 | Wolfson | G08G 1/141 |
| | | | | 705/13 |
| 2015/0154868 | A1* | 6/2015 | Neuner | G08G 1/14 |
| | | | | 455/414.1 |
| 2015/0242944 | A1* | 8/2015 | Willard | G06Q 10/02 |
| | | | | 705/5 |
| 2016/0047672 | A1* | 2/2016 | Sachdev | G01C 21/3423 |
| | | | | 701/438 |
| 2016/0140845 | A1* | 5/2016 | Agrawal | G08G 1/146 |
| | | | | 340/932.2 |
| 2016/0189098 | A1* | 6/2016 | Beaurepaire | H04W 12/084 |
| | | | | 705/337 |
| 2016/0196747 | A1* | 7/2016 | Tsyrklevich | G01C 21/3667 |
| | | | | 701/532 |
| 2016/0217510 | A1* | 7/2016 | Brown | G06Q 30/0284 |
| 2016/0371788 | A1* | 12/2016 | Rackley, III | G06Q 10/105 |
| 2017/0069016 | A1* | 3/2017 | Rackley | G06Q 30/0645 |
| 2017/0178511 | A1* | 6/2017 | Berns | G08G 1/144 |
| 2017/0262770 | A1* | 9/2017 | Purdy | G06N 20/20 |
| 2017/0329341 | A1* | 11/2017 | Rakshit | H04W 4/029 |
| 2018/0010915 | A1* | 1/2018 | Wilhelm | G01C 21/20 |
| 2018/0032928 | A1* | 2/2018 | Li | G06Q 10/08 |
| 2018/0053423 | A1* | 2/2018 | DaCosta | G06Q 50/30 |
| 2018/0137525 | A1* | 5/2018 | Cotton | G06N 5/04 |
| 2018/0174454 | A1* | 6/2018 | Tiwaree | G06Q 40/12 |
| 2018/0178741 | A1* | 6/2018 | Poeppel | B60R 16/0236 |
| 2018/0300660 | A1* | 10/2018 | Coan | H04W 4/029 |
| 2018/0330614 | A1* | 11/2018 | Lin | G07F 17/0057 |
| 2018/0336784 | A1* | 11/2018 | Liu | G08G 1/096838 |
| 2018/0341880 | A1* | 11/2018 | Kislovskiy | G06Q 50/30 |
| 2018/0341895 | A1* | 11/2018 | Kislovskiy | G06Q 50/30 |
| 2018/0342034 | A1* | 11/2018 | Kislovskiy | G06Q 10/06315 |
| 2018/0349792 | A1* | 12/2018 | Zhao | G06N 20/00 |
| 2018/0374004 | A1* | 12/2018 | Eone | G08G 1/149 |
| 2019/0026671 | A1* | 1/2019 | Al Falasi | G01C 21/3438 |
| 2019/0066133 | A1* | 2/2019 | Cotton | G06Q 30/0202 |
| 2019/0146508 | A1* | 5/2019 | Dean | G05D 1/0285 |
| | | | | 701/26 |
| 2019/0197798 | A1* | 6/2019 | Abari | G06Q 10/02 |
| 2019/0204097 | A1* | 7/2019 | Starns | G07C 5/008 |
| 2019/0205812 | A1* | 7/2019 | Afzal | H04L 67/14 |
| 2019/0205842 | A1* | 7/2019 | Starns | G05D 1/0088 |
| 2019/0205961 | A1* | 7/2019 | Baren | G06Q 20/12 |
| 2019/0206008 | A1* | 7/2019 | Dutta | G06Q 10/063112 |
| 2019/0251496 | A1* | 8/2019 | DaCosta | H04W 4/20 |
| 2019/0285425 | A1* | 9/2019 | Ludwick | G08G 1/202 |
| 2019/0385265 | A1* | 12/2019 | Liu | G06Q 50/30 |
| 2020/0065908 | A1* | 2/2020 | Rackley, III | G06Q 10/105 |

* cited by examiner

OPTIMIZING AND PREDICTING AVAILABILITY OF RESOURCES IN A SHARED VEHICLE ENVIRONMENT

BACKGROUND

As cities become more complex and populations continue to grow and become more mobile, demand on transportation and related infrastructure is increased. Additionally, as lifestyles become increasingly dynamic, people and places are becoming more connected than ever before. People often need to travel within, and between, cities for various reasons such as for work, socializing, and recreation, among others. The frequency and scheduling of travel may vary greatly as well, be it a daily commute, a scheduled event, or a spontaneous trip. Regardless of the distance, destination, or time of travel, people expect to have the freedom to move about and be at the desired location at the desired time. Thus, transportation and mobility systems are fundamental in making such a lifestyle possible. In urban and suburban areas alike, transportation mode sharing programs, such as bicycle ("bike") sharing programs, have become commonplace. Such programs, in essence, provide a service whereby bicycles are made available for shared use to individuals on a short-term basis, such as for rent or borrow. However, conventional bike sharing systems have various shortcomings that lead to a suboptimal user experience and suboptimal utilization efficiency. For example, it may be difficult to for users to know whether there will be bikes available at a certain time and location. The situation may arise when a user plans to borrow a bike from a certain bicycle station only to arrive at the bike station to find that there all of the bicycles have been checked out. This makes it difficult for users to make travel plans with certainty.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for vehicle sharing. In particular, various embodiments provide for predicting availability of vehicles or docking spots in a shared vehicle environment and utilizing such predictions to make recommendations or otherwise optimize user experience and utilization of the shared vehicle environment.

An intelligent bicycle sharing system, or other vehicle sharing system, is able to provide helpful bicycle availability predictions based on historical data, including various utilization statistics. Historical data can be collected over time as users use the bicycle sharing system. For example, the historical data may include the number of available bicycles at various locations and times, as well as contextual data associated with the locations and times. Contextual data may include data regarding the weather, local events, season, day of the week or year, news events, among other environmental factors that may potentially influence bicycle utilization, directly or indirectly. In some embodiments, a model, such as a machine learning model (e.g., neural network) may be trained using the historical data as training data such that the model can predict bicycle availability for a certain future time and location. In various embodiments, the bicycle availability prediction may be determined using additional types of data, such as current availability and current user demand.

In various embodiments, a user may request, using a user device (e.g., smartphone), a bicycle availability prediction for a certain time and at a certain location. Upon receiving the request, the time and location may be processed using a trained model to determine the bicycle availability prediction for that time and location. The bicycle availability prediction may be further processed and presented to the user in a variety of forms. For example, the bicycle availability prediction may be presented as a likelihood of there being at least one bicycle available at that time and location. In another example, the bicycle availability prediction may be presented as an estimated number of bicycles that will be available at that time and location. Additionally, in various embodiments, a recommendation can be made to the user to optimize their chance of reserving a bicycle. For example, if the bicycle availability prediction for the requested time and location is relatively low or unfavorable, the recommendation may include a suggestion for an alternate time (e.g., 20 minutes later than the initially requested time) or alternate location (nearby location) that has a more favorable availability prediction. In various embodiments, the bicycle sharing system may also include a finite number of docking spots. Thus, the bicycle sharing system is also able to predict availability of docking spots based on historical data, and provide recommendations, using similar techniques as described above with respect to predicting availability of bicycles.

Although examples illustrated in the present disclosure describe a bicycle sharing system, that systems and methods provided here are applicable to any type of vehicle or mobility resources, such as cars, airplanes, boats, carts, scooters, motorized bikes or scooters, skates, hoverboards, among many others.

Various other features and application can be implemented based on, and thus practice, the above described technology and presently disclosed techniques. Accordingly, approaches in accordance with various embodiments improve the technology of bicycle sharing systems. Traditional bicycle sharing technology includes mechanisms for checking out (e.g., unlocking) bicycles from docking stations based user authentication or payment authentication. The present disclosure provides an intelligent networked bicycle sharing system that is instrumented with specialized sensors, network interfacing devices, and other electronics that enable users to receive up to date information and even future availability predictions that can enable them to better plan their commute. Various other applications, processes, and uses are presented below with respect to the various embodiments, each of which improves the operation and performance of the computing device(s) on which they are implemented.

Figure 1:
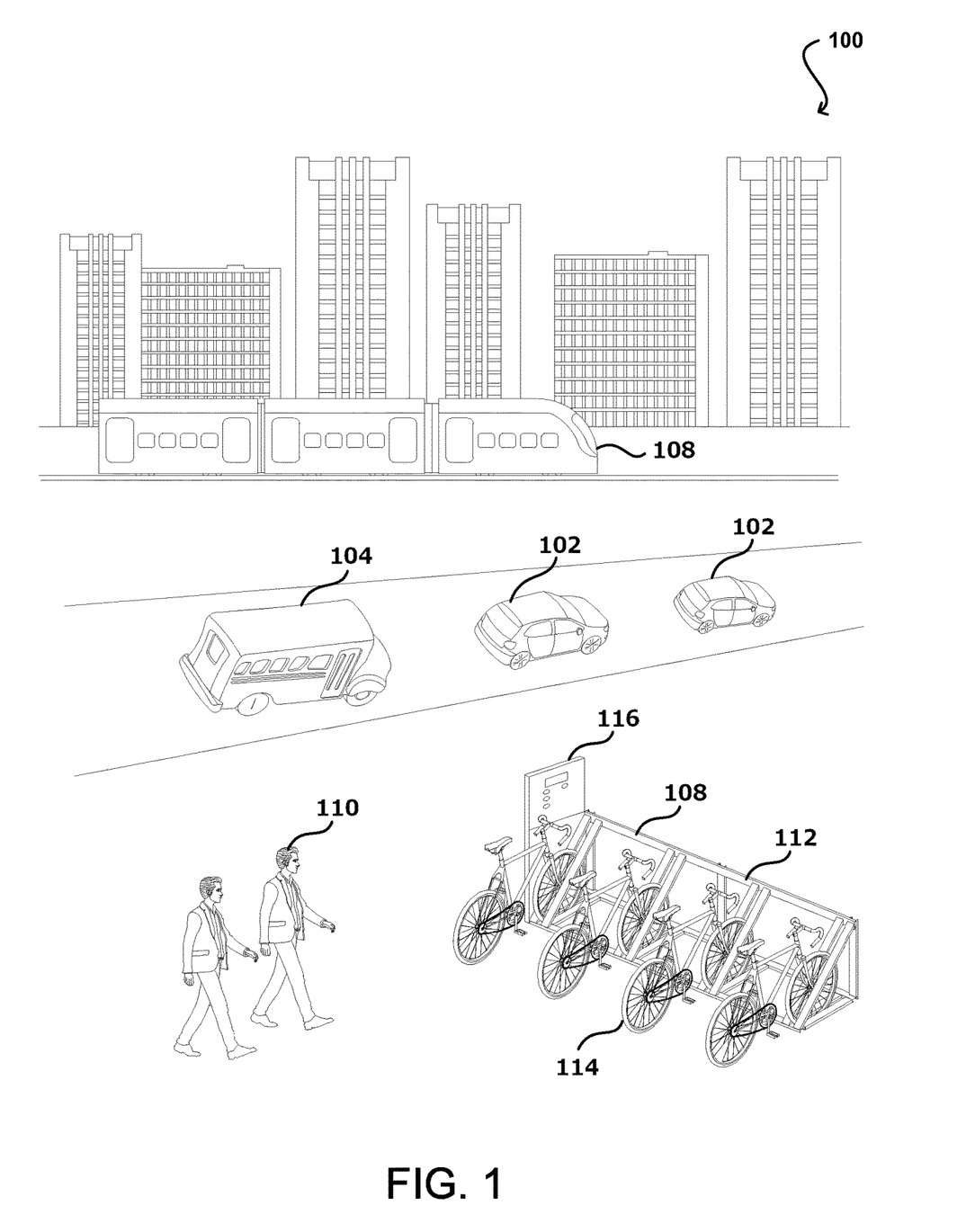
FIG. 1 illustrates an example transportation landscape in which the present systems and methods may be implemented.

FIG. 1 illustrates an example transportation landscape 100 in which the present systems and methods may be implemented, in accordance with various embodiments. As illustrated in FIG. 1, many types of modes of transportation and mobility may be available in various cities, often depending on certain characteristics of the city, such as population size and density, population distribution, terrain, among others. Some examples of modes of transportation and mobility may include personally owned vehicles 102, public transportation systems such as buses 104 and trains 106, bike sharing 108, and walking 110. Cities may often have a primary mode of transportation or a combination of several modes.

For example, individual car ownership may be a primary mode of transportation in sprawling cities where the population is relatively less dense. Such cities tend to have a less developed public transportation system (e.g., buses, commuter trains) due to the low utilization efficiencies. For example, the cost of developing, maintaining, and operating such systems may outweigh the benefit they provide to the community. In such cities, since locations of interest may be further apart, walking and biking may be less common as well. Thus, the population in such cities is heavily reliant on individual cars. However, there may be certain times or locations that are prone to road congestion due to the number of cars on the road or in the area, such as during typical work commuting hours also known as "rush hour" and when there are special events that cause large groups of people to congregate in a small area, such as for a concert or sporting event. Additionally, individual cars are rarely used at full capacity, especially when used for work commutes, resulting in efficiency losses in terms of both space and energy.

Conversely, densely populated cities tend to have a more multi-modal mobility landscape. For example, in addition to individual cars, densely populated cities also tend to have a more established public transportation system and the population tends to rely more heavily on public transportation. Destinations (e.g., offices, homes, restaurants) are likely to be closer together and more people are likely to live close to bus stops, subway stations, etc., making such mean of transportation useful and convenient. However, public transportation conventionally runs on fixed schedules and fixed routes and have fixed pick-up/drop-off locations. This means that people have to plan around such factors, including planning their schedules, determining which destinations are convenient, and even where they want to live. For example, some buses only run during certain operating hours and are thus are not available as an option during off hours. The inflexibility of conventional transportation also affects businesses and real estate utilization. For example, businesses located close to subway stations or other public transportation access points may have increased foot traffic or patronage due to the convenience. Similarly, residential buildings that are close to such public transportation access points may also be more desirable at least to some. In effect, the fixed nature of conventional transportation coupled with the population's reliance on it may cause these densely populated cities to become even more clustered around these access points, rather than evenly utilizing space across the city. Commuter trains provide a means for traveling within and between several cities and is prevalent in and between cities with populations that may live in one city and work in another city or other have populations that frequently travel between the cities. However, like other forms of conventional public transportation, commuter trains typically run according to a set schedule between set stops.

Densely populated cities may also be more conducive for walking, as destinations may often be within a short, walkable, distance. Walking also provides the added benefits of independence, energy conservation, and fitness gains. However, cities and neighborhoods may vary in pedestrian safety and ease. For example, designated sidewalks and other paved pedestrian paths may provide a better environment for pedestrians, and thus more people may consider walking as a practical form of travel. Additionally, weather may also influence pedestrians. For example, inclement weather may make walking impossible at times, even for a short distance. Additionally, there may be other circumstances that make walking particularly difficult, such as if a person is carrying large or heavy items or wearing uncomfortable shoes, the destination being further away, among other situations. Thus, although walking may be an available form of mobility in certain types of environments, it may be difficult to rely upon it all of the time. Similar to walking, bicycles provide an alternative to that allows people to travel relatively independently while conserving energy and gaining fitness benefits. However, people may not have space to store a bicycle or may not use bicycles frequently enough to warrant owning one. Bike sharing has become a popular means of providing shared access to bicycles when needed. For example, as illustrated in FIG. 1, a user can rent or borrow a bicycle from a bike station for a particular trip and return the bicycle to another bike station at their destination or to the original bike station upon returning from the trip.

As populations grow and lifestyles become increasingly dynamic, people and places are becoming more connected than ever before. People often need to travel within and between cities for various reasons such as for work, socializing, recreation, among others. Such travels may vary greatly in distance, such as a few blocks, across town, across the country, or even abroad. The frequency and scheduling of the travels may vary greatly as well, such like daily commutes, a scheduled event, and spontaneous trips. Regardless of the distance, destination, or time of travel, people expect to have the freedom to move about and be at their desired location at a desired time. Thus, transportation and mobility systems are fundamental in making such a lifestyle possible. However, conventional means of mobility are largely legacy systems that may no longer be suitable to meet the needs of present and future cities and their populations. For example, as people become more connected, there may often be influxes of traffic to certain area due to large gathers, such as for organized events, to spontaneous gatherings quickly galvanized through social media, among other phenomenon that is unique to modern societies. Transportation systems and modalities need to be robust enough to handle the changing demands, redefining and yet working within the constraints of existing infrastructures. However, as populations grow, more land is used to build housing, office, and retail space to meet the demands of the increasing population. Thus, additional transportation is needed to support the mobility of the population, yet less space is available for transportation. For example, less space may be available for parking and yet there may be an increase in the number of cars. Such resource constraints mean that transportation and mobility technology must be designed and innovated upon for increased efficiency, providing dynamic services that meet the needs of present and future populations while reducing the resources required to do so.

The present disclosure is directed to technology for bicycle sharing systems as well as other vehicle sharing systems. Existing bicycle sharing systems 108 typically include a station 112 which holds a plurality of bicycles 114. A user may interact with a kiosk 116 at the station 112 to rent or borrow one of the available bicycles 114 if there are any. For example, the user may swipe a card (e.g., credit card, membership card, identification card) to unlock a bicycle. Conversely, when a user is finished using a bicycle, they may return the bicycle by docking the bicycle back onto a station. However, the situations may arise in which a user arrives at a bicycle station with the intention of getting a bicycle, only to find that there are no bicycles available, throwing a wrench into their plans. Similarly, a user may want to return their bicycle to a station when they arrive at their destination but find that the station is full and has no docking spots available. Thus, the user may have to find another station, which may be further away and without knowing if there will be docking spots available at that station. Various embodiments of the present disclosure provide an intelligent bicycle sharing system for optimizing and predicting availability of vehicles or docking spots in a shared vehicle environment, and utilizing such predictions to make recommendations or otherwise optimize user experience and utilization of the shared vehicle environment.

Figure 2:
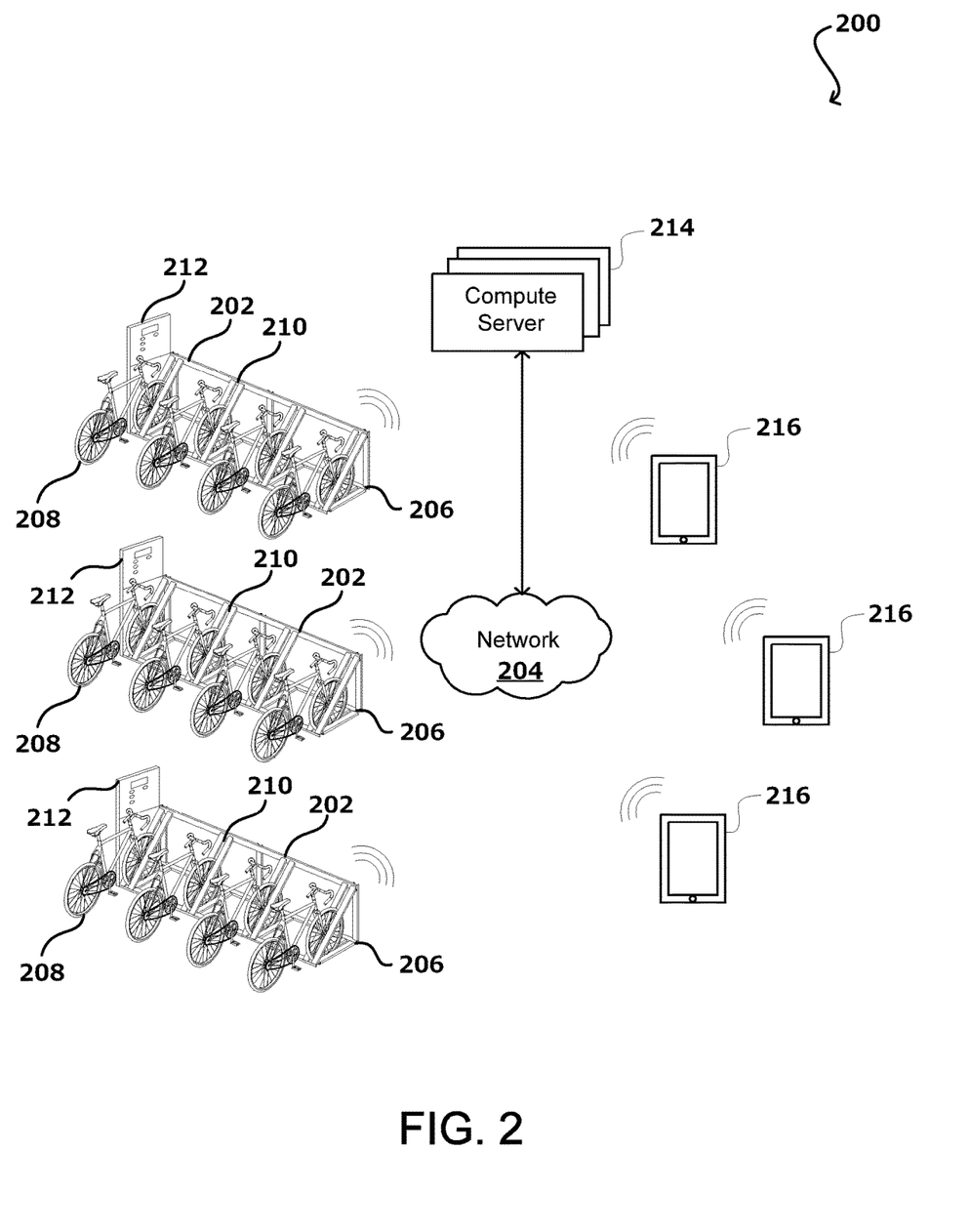
FIG. 2 illustrates an example of a smart bicycle sharing system with station-based intelligence, in accordance with various embodiments of the present disclosure.

FIG. 2 illustrates an example of a smart bicycle sharing system 200 with station-based intelligence, in accordance with various embodiments. An intelligent bicycle sharing system 200 may include a plurality of bicycle sharing stations 202 located in different geographic locations, such as various parts of a neighborhood, city, or across multiple regions across the country. The bicycle stations are connected to one or more networks 204, such as the Internet, a cellular network, a local area network (LAN), an Ethernet, Wi-Fi, or a dedicated network, among other such options. The bicycle sharing stations 202 may collect various data regarding bicycle utilization and other parameters associated with respective stations. Such data collected from the plurality of bicycle stations, coupled with respective metadata, may be used by a compute server 214 to determine various utilization statistics, patterns, and other insights that can be used to optimize the intelligent bicycle sharing system 200. User devices 216, such as smart phones, tablets, wearables (e.g., smart watches, smart classes, smart rings, etc.), personal computers, and the like, may be communicative with individual bicycle stations 202 and/or the compute server 214 over the one or more networks 204, allowing users to provide input information and receive output information with respect to the bicycle sharing system 200.

In various embodiments, a bicycle sharing station 202 of the intelligent bicycle sharing system 200 may include a docking portion 206 for holding a plurality of bicycles 208. In some embodiments, the docking portion 206 may have a specific number of docking spots 210 and thus can hold a maximum number of bicycles 208. In some other embodiments, the docking portion 206 does not have individually defined docking spots. The docking portion may include locking mechanisms for locking the bicycles 208 to the bicycle sharing station 202. In some embodiments, there is one locking mechanism for each docking spot for locking one bicycle to the bicycle sharing station 202. In this example, the locking mechanism may lock conventional bicycles to the bicycle station, in which the bicycles do not need specific or corresponding hardware. Thus, in this embodiment, the bicycles 208 of the intelligent bicycle sharing system may be conventional bicycles that do not include special hardware or electronic devices. In some embodiments, the docking portion 206 may not include locking mechanism such that the bicycles can be freely used. Specifically, the bicycles 208 in such embodiments may be removed and returned without needing to be unlocked from the bicycle sharing station 202. In such embodiments, the bicycles 208 and/or the bicycle stations may include various sensor devices to detect when a bicycle is removed from the station, when a bicycle is returned to the station, and general availability of bicycles at a station, among other utilization data.

A bicycle sharing station 202 may include a kiosk portion 212 for facilitating checking out or checking in of bicycles. In some embodiments, the bicycle sharing station 202 may include one kiosk that controls the locking and unlocking of all of the docking spots at the bicycle station. In some other embodiments, each docking spot may include its own kiosk. A kiosk 212 may include an interface, such as a human-machine interface that may include a combination of user interfacing components, such as a display, a keypad, buttons, a touchscreen, audio output, microphone, camera, among others. The kiosk 212 may also include various payment or identity verification devices, such as coin-drops or cash receptacles, magnetic card readers for reading credit cards, debit cards, account cards, or other types of magnetic cards. The kiosk 212 may also include near-field communication (NFC) readers, Bluetooth, among various other wireless communication interfaces and devices. The kiosk 212 may also include one or more biometric identification features such as a fingerprint recognition, facial recognition, and the like.

The kiosk portion 212 may enable a user to check out a bicycle by performing one or more actions, such as entering account information, swiping, tapping, or holding a card or other appropriate device and/or object at the card reader, depositing cash, among others. If the information provided by the user, either in the form of entered authentication parameters (e.g., account number, password), credit card or account card is authenticated, other device (e.g., phone, smartwatch), a bicycle 208 may be unlocked from the bicycle sharing station 202 and the user can use the bicycle 208. In some embodiments, depositing a required amount of cash may also cause the bicycle to be unlocked.

In some other embodiments, the bicycle station 202 may include a wireless communication interface that does not include human interfacing components. Rather, in such embodiments, the bicycle station 202 may communicate with a user device 216 directly through a wireless communication protocol. For example, the user device 216 may include a mobile device carried by a user. The user device 216 may have a specific software application (i.e., "app") installed thereon for providing a user interface between the user and the bicycle sharing station 202. A user may perform certain actions on the user device 216 through the app, such as to check out and/or check in a bicycle 208. In some embodiments, the app may be associated with an account for the user and/or be connected to a form of payment such as credit card credentials (e.g., credit card number) or bank account credentials (e.g., account number, routing number), or other third party payment platforms. In some embodiments, authentication and user identification may be performed passively, such as through proximity based sensing. For example, a user carrying such a device may approach a bicycle station, and when the device is within a signal detection range of the bicycle station, the bicycle station may detect the device and receive a signal emitting from the device. The signal may include authentication parameters, thereby causing the user to be authenticated and a bicycle to become unlocked.

In any of the above embodiments, among other embodiments, the intelligent bicycle sharing system may collect various types of data across the plurality of bicycle sharing stations 202. For example, each bicycle sharing station 202 may collect data regarding when a bicycle is checked in or out, and by whom. In some embodiments, each bicycle 208 in the intelligent bicycle sharing system includes a unique identifier such that the bicycle sharing stations 202 can identify which bicycle is being checked out or checked in. Thus, the journey of a particular bicycle 208 can be tracked. For example, it can be detected that bicycle A was checked out at a bicycle station at a first location and checked in at another bicycle station at a second location at a later time, and thus it can be inferred that bicycle A was used for a trip from the first location to the second location. The data collected from the bicycle stations may include metadata such as a bicycle station identifier and timestamp, and may include or be associated with a geographic location among other metadata.

A compute environment 214 may receive the data and the metadata collected from bicycle stations via the one or more networks 204. The at least one network 204 can include any appropriate network, including an intranet, the Internet, a cellular network, a local area network (LAN), or any other such network or combination, and communication over the network can be enabled via wired and/or wireless connections. In various embodiments, the compute environment 214 may include one or more servers with one or more processors and storage elements for storing and processing the data received from the bicycle sharing stations 202 and performing various functions utilizing the data, such as authenticating a user based on provided credentials, performing transactions, recording and analyzing bicycle usage data, tracking a location of a bicycle, among other computer functions. In various embodiments, one or more data analysis models (e.g., trained machine learning based model) may be stored in the compute environment and used to make determinations or predictions based on various data. In some embodiments, the compute environment 214 may include a distributed computing system, or "cloud computing" environment, in which computing and storage may be distributed across a network of resources, such as servers and storage, which may be rapidly provisioned as needed.

In various embodiments, a user interface to the intelligent bicycle sharing system may be provided via the user devices 216, which are connected to the one or more networks 204. The user devices 216 may include devices through which a user can watch, listen to, or read content, and include at least one form of input such as a keyboard, buttons, or touchscreen, and at least one form of output such as a display or speaker. The user devices 216 can include various computing devices such as smart phones, tablet computers, wearable computers (e.g., smart glasses or watches), desktop or notebook computers, and the like. The user devices 216 can include any appropriate electronic device operable to send and receive requests, messages, or other such information over an appropriate network and convey information back to a user of the device. In this example, the user devices 216 can communicate with the server compute environment 214 over the at least one network 204. A user is able to utilize a user device 216 to interact with the intelligent bicycle sharing system, such as to view updates or data related to various bicycle stations 202, such as currently available bicycles, and the like. The user may also be able to check out a bicycle or check in a bicycle through the user device 216, access their account, among other interactions. In some embodiments, a software application ("app") may be installed on the user device 216 specifically to provide a user interface for interacting with the intelligent bicycle sharing system.

Figure 3:
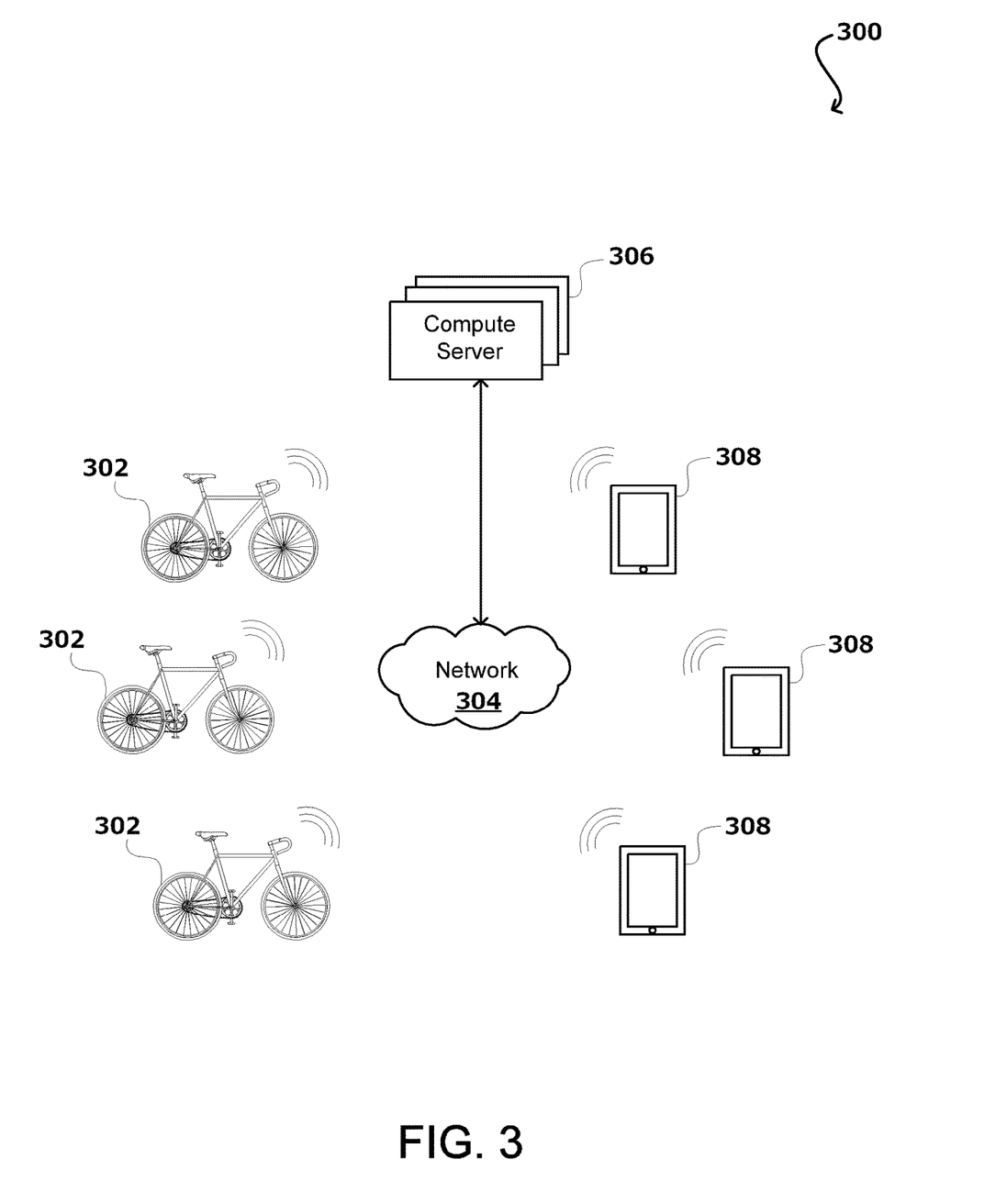
FIG. 3 illustrates an example of a smart bicycle sharing system with bicycle-based intelligence, in accordance with various embodiments of the present disclosure.

FIG. 3 illustrates an example of a smart bicycle sharing system 300 with bicycle-based intelligence, in accordance with various embodiments. An intelligent bicycle sharing system 300 may include a plurality of networked bicycles 302. The bicycles are connected to one or more networks 304, such as the Internet, a cellular network, a local area network (LAN), an Ethernet, Wi-Fi, or a dedicated network, among other such options. The bicycles 302 may collect various data regarding bicycle utilization, geographic location, routes taken, among other information. Such data collected from the plurality of bicycles, coupled with respective metadata, may be used by a compute server 306 to determine various utilization statistics, patterns, and other insights that can be used to optimize the intelligent bicycle sharing system 300. User devices 308, such as smart phones, tablets, wearables, personal computer, and the like, may be communicative with individual bicycles 302 and/or the compute server 306 over the one or more networks 304, allowing users to provide input information and receive output information with respect to the bicycle sharing system 300.

In various embodiments, the intelligent bicycle sharing system 300 may be dockless, in which the bicycles 302 do not need to be docked at individual docking spots as described above with respect to the bicycle stations 202 in FIG. 2. Rather, the bicycles 302 may be docked at designated zoned areas, conventional parking spots and bicycle racks, or anywhere a bicycle may be positioned. The bicycles 302 may each include a processor, a network communications interface, and a location tracking device such as a global position system (GPS) unit. These components allow the bicycle to collect data and communicate the data over the one or more networks. For example, the GPS unit tracks the geographic location of the bicycle 302, allowing the current location as well as a travel path of the bicycle 302 to be known.

In some embodiments, a bicycle 302 may include a locking mechanism that locks the bicycle to a structure. For example, a bicycle 302 may be locked to a designated structure. In some other embodiments, the locking mechanism may lock the functions of the bicycle, rendering it unusable without necessarily locking it to a structure. For example, the locking mechanism may lock a wheel of the bicycle, a gear, a chain, or any other component of the bicycle that is needed in order for a user to ride the bicycle. In various embodiments, the locking mechanism of a bicycle may be released upon performing a user authentication process, which may take many forms.

A bicycle 302 may include an interface, such as a human-machine interface that may include a combination of user interfacing components, such as a keypad or touch screen through which a user may enter credentials (e.g., username, password, pin number). In some embodiments, the credentials may be in the form of biometric data such as fingerprint, retina scan, and the like. In some embodiments, the bicycle 302 may include detectors or readers for accepting cards (e.g., credit cards, debit cards, account cards, or other types of membership/identification cards) or other signal-based tokens (e.g., key fob, smart phone, wearable device, RFID devices). The detectors or readers on the bicycle 302 may include near-field communication (NFC) readers, Bluetooth, among various other wireless communication interfaces and devices. The interface on the bicycle 302 may enables user to unlock or otherwise check out a bicycle by performing one or more actions, such as entering account information, swiping, tapping, or holding a card or at the card reader, presenting a smart phone or other user device, among others. If the user is successfully authenticated, the bicycle 302 may be unlocked and the user can use the bicycle. In some embodiments, the detector on the bicycle 302 may be a proximity based sensor, which may detect a signal-based token within range and automatically unlock the bicycle. The identity of the user may also be identified through the token. In various embodiments, the bicycle may include various output devices as a part of the human-machine interface, such as speakers, displays, tactile feedback device, among others, for presenting various information to the user.

In some other embodiments, the bicycles 302 may include a wireless communication interface that does not include human interfacing components. Rather, in certain such embodiments, the bicycles 302 may communicate with a user device 308 through a wireless communication protocol. In other such embodiments, the bicycles 302 may communication with a compute environment 306 over the one or more networks 304 rather than directly with the user device 308. For example, the user device 308 may include a mobile device carried by a user. The user device 308 may have a specific software application (i.e., "app") installed thereon for providing a user interface between the user and the bicycles 302. The user may perform certain actions on the user device through the app to check out and/or check in a bicycle. In some embodiments, the app may be associated with an account for the user and/or be connected to a form of payment such as credit card credentials (e.g., credit card number) or bank account credentials (e.g., account number, routing number), or other third party payment platforms. In some embodiments, authentication and user identification may be performed passively, such as through proximity based sensing. For example, a device may emit a user carrying such a device may approach a bicycle station, and when the device is within a signal detection range of the bicycle station, the bicycle station may detect the device and receive a signal emitting from the device. The signal may include authentication parameters, thereby causing the user to be authenticated and a bicycle to become unlocked. In other embodiments, the user device 308 may submit a request to the compute environment 306, including credentials and location or a specific bicycle the user would like to unlock. The computer environment may authenticate the request and transmit instructions to the bicycle to be unlocked.

As described, the bicycles 302 may include various sensors, processors, and other electronic devices to gather and transmit data. For example, it may be detected when a user checks out or unlocks the bicycles as well as the identity or account associated with the user, and when the user checks the bicycle back in to be available for use by another user. Additionally, the location of the bicycles during these events, and at any other time, may be known as well. Various other types of data may be detected as well, and can be used to provide various useful insights or perform various tasks.

The compute environment 306 may receive the data and the metadata collected from the bicycles via the one or more networks 304. The at least one network 304 can include any appropriate network, including an intranet, the Internet, a cellular network, a local area network (LAN), or any other such network or combination, and communication over the network can be enabled via wired and/or wireless connections. In various embodiments, the compute environment 306 may include one or more servers with one or more processors and storage elements for storing and processing the data received from the bicycle stations and performing various functions utilizing the data, such as authenticating a user based on provided credentials, performing transactions, recording and analyzing bicycle usage data, tracking a location of a bicycle, among other computer functions. In various embodiments, one or more data analysis models (e.g., trained machine learning based model) may be stored in the compute environment and used to make determinations or predictions based on various data. In some embodiments, the compute environment may include a distributed computing system, or "cloud computing" environment, in which computing and storage may be distributed across a network of resources, such as servers and storage, which may be rapidly provisioned as needed.

In various embodiments, as mentioned, a user interface to the intelligent bicycle sharing system 300 may be provided via the user devices 308. The user devices 308 may include devices through which a user can watch, listen to, or read content, and include at least one form of input such as a keyboard, buttons, or touchscreen, and at least one form of output such as a display or speaker. The user devices 308 can include various computing devices such as smart phones, tablet computers, wearable computers (e.g., smart glasses or watches), desktop or notebook computers, and the like. The user devices 308 can include any appropriate electronic device operable to send and receive requests, messages, or other such information over an appropriate network and convey information back to a user of the device. In this example, the user devices 308 can communicate with the server compute environment 306 over the at least one network 304. A user is able to utilize a user device 308 to interact with the intelligent bicycle sharing system, such as to view updates or data related to various bicycle stations, such as currently available bicycles, and the like. The user may also be able to check out a bicycle or check in a bicycle through the user device, access their account, among other interactions. In some embodiments, a software application ("app") may be installed on the user device specifically to provide a user interface for interacting with the intelligent bicycle sharing system.

The present disclosure provides an intelligent vehicle sharing system, such as the bicycle sharing systems of FIGS. 2 and 3, that is able to provide helpful vehicle availability predictions based on historical data, including various utilization statistics. Historical data can be collected over time as users use the vehicle sharing system. For example, the historical data may include the number of available vehicle at various locations and times, as well as contextual data associated with the locations and times. In some embodiments, a vehicle may be available if it has been checked in and not yet checked out, and a vehicle may be unavailable if it has been checked out but not yet checked in. A vehicle may also be unavailable if it is checked out for maintenance and the like. Contextual data may include data regarding the weather, local events, season, day of the week or year, news events, among other environmental factors that may or influence vehicle utilization, directly or indirectly. In some embodiments, a model, such as a machine learning model (e.g., neural network) may be trained using the historical data as training data such that the model can predict vehicle availability for a certain future time and location. In various embodiments, the vehicle availability prediction may be determined using additional types of data, such as current availability, demand, among other present conditions.

Figure 4:
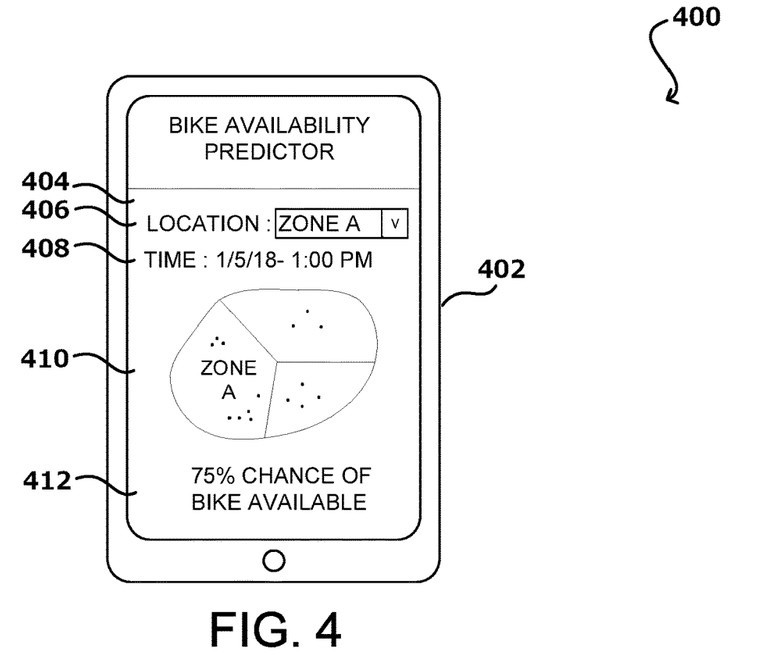
FIG. 4 illustrates an example user interface on a user device for optimizing and predicting vehicle availability, in accordance with various embodiments.

FIG. 4 illustrates an example user interface 400 on a user device 402 for optimizing and predicting vehicle availability, in accordance with various embodiments. Specifically, a user can make a request for a vehicle availability prediction through the interface, which may be accessed through a user device. The interface may be provided through a website or app associated with a vehicle sharing system, such as those described above with reference to FIGS. 2 and 3. The interface may provide interface elements 404 prompting the user to select a time 406 and a location 408 at which they'd like to check out a vehicle. Thus, the user may request a vehicle availability prediction for a certain time and at a certain location of their choosing. Upon receiving the request, the time and location may be processed through the above-mentioned trained model to determine the vehicle availability prediction 412 for that time and location. The vehicle availability prediction 412 may be further processed and presented to the user in a variety of forms. For example, the vehicle availability prediction 412 may be presented as a likelihood of there being at least one vehicle available at that time and location. In another example, the vehicle availability prediction 412 may be presented as an estimated number of vehicles that will be available at that time and location. In some embodiments, the interface may include a density map 410 that illustrates predicted availability of vehicles at the selected time and location. Additionally, in various embodiments, a recommendation can be made to the user to optimize their chance of getting a vehicle. For example, if the vehicle availability prediction for the requested time and location is relatively low or unfavorable, the recommendation may include a suggestion for an alternate time (e.g., 20 minutes later than the initially requested time) or vehicle location (nearby location) that has a more favorable availability prediction.

Figure 5:
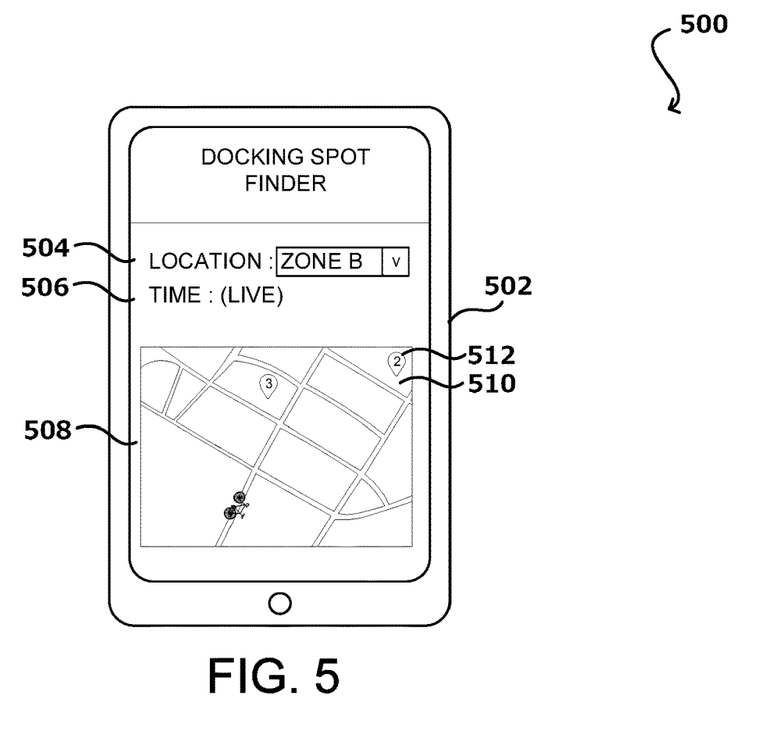
FIG. 5 illustrates an example user interface for optimizing and predicting docking spot availability, in accordance with various embodiments.

FIG. 5 illustrates an example user interface 500 for optimizing and predicting docking spot availability, in accordance with various embodiments. The user interface 500 may be provided on a user device 502. In various embodiments, the vehicle sharing system may include a finite number of docking spots. Thus, the vehicle sharing system is also able to predict availability of docking spots based on historical data, and provide recommendations regarding vehicles docking, using similar techniques as described above with respect to predicting availability of vehicles. For example, a user may select a time 504 and location 506 at which they would like to dock a vehicle in a vehicle sharing environment. The interface may provide a live map view 508 including the selected location. In some embodiments, the live map view may indicate one or more docking stations 510 or zones at or close to the selected location. In some embodiments, instead of the user providing the time at which they would like to dock the vehicle, the time is calculated based on the user's current location and an estimated travel time to the selected location. The estimated travel time may be determined based at least in part on the user's historical behavior data such as average travel speed and current traffic conditions.

In some embodiments, a current number of available docking spots 512 at each docking station may be displayed and a route to the best docking station may be provided on the map view. The best docking station may be determined based on proximity to the selected location and a docking spot availability prediction for the docking station. In some embodiments, the docking spot availability prediction based be determined using a neural network trained on historical docking spot availability data across various times and locations. The docking spot availability prediction may also take into consideration currently observed conditions, such as a number of currently available spots and a number of users currently enroute to the location either to dock a vehicle in a docking spot or remove (e.g., check out) a vehicle from a docking spot. In some embodiments, as the user is enroute to the location, the current conditions may change, and the docking sport availability prediction may be recalculated based on the updated current conditions. Thus, in some embodiments, the optimal docking station for the user may change and the map view is updated to direct the user to the updated optimal docking station.

Figure 6:
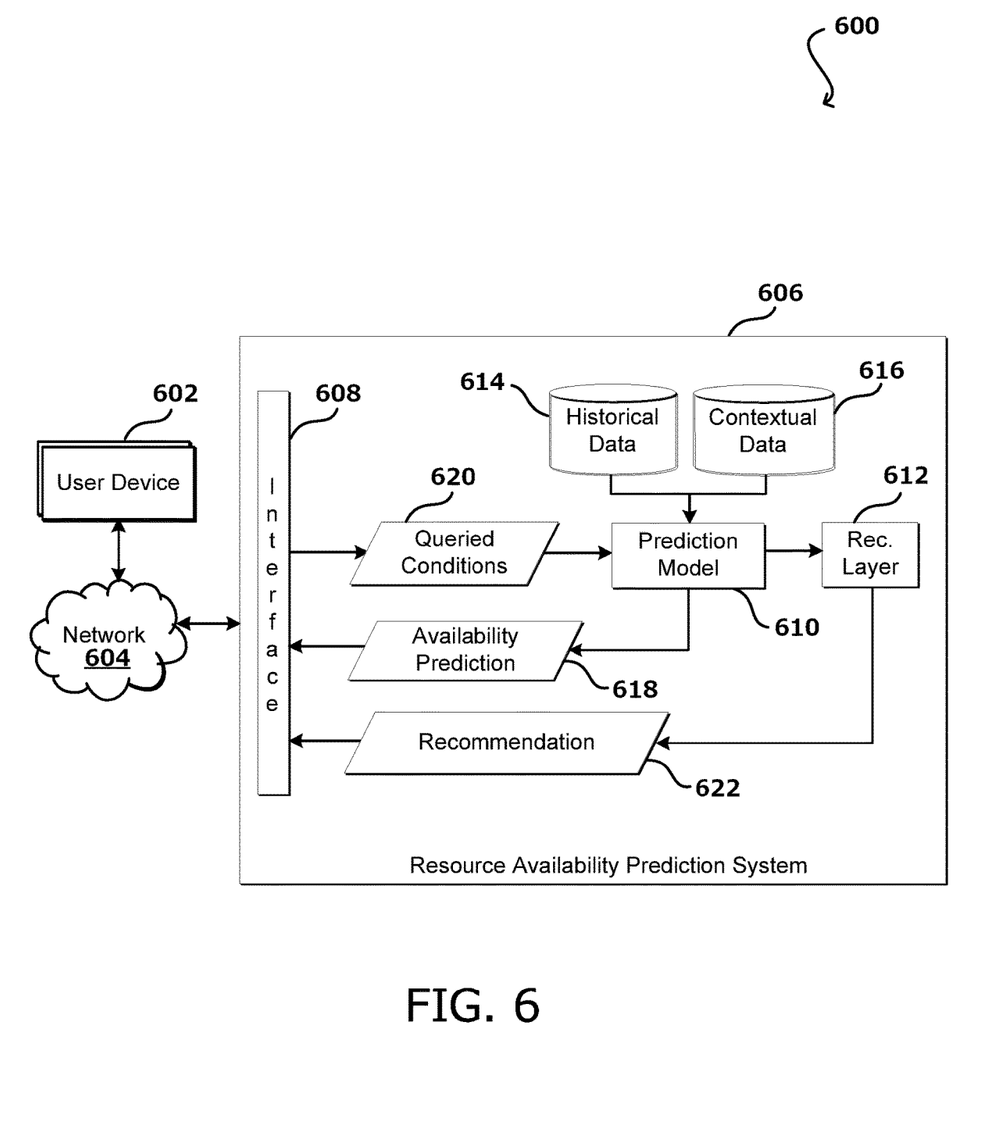
FIG. 6 illustrates a diagram of an example system implementation for providing resource availability predictions for a vehicle sharing environment, in accordance with various embodiments.

FIG. 6 illustrates a diagram 600 of an example system implementation for providing resource availability predictions for a vehicle sharing environment, in accordance with various embodiments. Resource may refer to vehicles, docking spots, or any other such resources that may have an available state and an unavailable state. In various embodiments, a user device 602 may be used by a user to request and obtain a resource availability prediction or recommendation for a desired time and location. In an example, the user device is able to send and receive information, such as requests, calls, and data, across one or more networks 604 to a resource availability prediction system 606. This may include a request for a resource availability prediction, a selection of the type of resource (e.g., vehicle or docking spot), a selection of the desired time and location the user would like to utilize the resource, among other options and information. The user device 602 may receive, over the one or more networks 604, the requested resource availability prediction, recommendations for more optimal times or locations, current resource availability data, among other information. In some embodiments, the user device 602 may include any type of computing devices having network connectivity, including smart phones, tablets, smart watches, smart glasses, other wearables, personal computers, notebook computers, and the like. The one or more networks 604 can include any appropriate network, such as the Internet, a local area network (LAN), a cellular network, an Ethernet, Wi-Fi, Bluetooth, radiofrequency, or other such wired and/or wireless network. In some embodiments, a plurality of user devices 602 may access the resource availability prediction system through different types of networks. The resource availability prediction system 606 can include any appropriate resources for performing the various functions described herein, and may include various servers, data stores, and other such components known or used for providing content from across a network (or from the "cloud").

In various embodiments, the resource availability prediction system 606 may include an interface 608, a prediction model 610, and a recommendation layer 612. The system 606 may also include a historical data database 614, and a contextual data database 616. Such modules and databases may be implemented jointly, separately, or in any combination on one or more devices, including physical devices, virtual devices, or both. Information may be passed between any of the modules and databases through the physical and/or virtual devices on which the modules and databases are implemented.

The interface layer 608 of the player matching system 606 may include a networking interface that can facilitate communication between the user device and the resource availability prediction system 606. Requests received by the resource availability prediction system 606 can be received through the interface layer 608. Example requests may include a request for a resource availability prediction for a user-selected time and location. The interface layer 608 may also provide outputs from the resource availability prediction system 606 to the user device, such as availability predictions, recommendations, updates and notifications, among others. The interface may also facilitate communication between the resource availability prediction system and individual vehicles or vehicle stations. For example, data (e.g., utilization data) collected by individual vehicles or vehicle stations may be transmitted to the resource availability prediction system where it is received through the interface. In the illustrated example, a request is sent from the user device over the one or more networks and received at the interface. In some embodiments, the request includes a set of query conditions (e.g., time value, location value, resource type). The queried conditions are input into the prediction model to determine a resource availability prediction for the queried conditions. In various embodiments, the model 610 may be trained on historical data stored in the historical data database 614.

The prediction model 610 may receive the query conditions 620 and determine a resource availability prediction 618. The prediction model 610 may include various types of models including machine learning models such as a neural network trained on the historical data. Other types of machine learning models may be used, such as decision tree models, associated rule models, neural networks including deep neural networks, inductive learning models, support vector machines, clustering models, regression models, Bayesian networks, genetic models, various other supervised or unsupervised machine learning techniques, among others. The prediction model 610 may include various other types of models, including various deterministic, nondeterministic, and probabilistic models. For example, the prediction model 610 includes one or more neural networks trained to determine a resource availability prediction for a selected time and location. As mentioned, the model may be trained on historical data 614 which may include, for example, a record of resource availability statistics across many times and locations. Additionally, the historical data may also include contextual data 616 associated with respective times and locations. The contextual data may include data regarding what was going on at a certain time and location, such as weather conditions, events, news, seasonal information, time of week or year, among other factors. As such factors may influence resource availability, the prediction model 610 may take into account this contextual data as well. In some embodiments, the historical data 614, including contextual data 616, may make up training data used to train the model. In certain such embodiments, the training data may include a large number of example input-output pairs. For example, a particular input-output pair may include as an input of a time, a location, and various contextual data associated with the time and location. The output may include the number of available resources (e.g., vehicles, docking spots) at that time and location. Given a large enough number of such example input-output pairs, the model may be trained to estimate an output based on a certain input. Specifically, the model may estimate a resource availability prediction 618 given a certain conditions 620 (e.g., time, location, and contextual data).

The neural network may be a regression model or a classification model. In the case of a regression model, the output of the neural network is a value on a continuous range of values representing the availability prediction results. In the case of a classification model, the output of the neural network is a classification into one or more discrete classes. For example, the output representing the availability prediction may be classified as "bad", "good", or "great" with respect to likelihood of obtaining a resource (e.g., vehicle, docking spot). The prediction model may output the estimated resource availability prediction, which may be transmitted to the user device via the interface. In some embodiments, the estimated availability may be presented in various forms, such as a likelihood of there being at least one selected resource (e.g., vehicle, docking spot) available at the selected time and location, or the estimated number of available resources at the selected time and location. The prediction may be represented as a score, a percentage, a confidence level, a rating, among other forms.

In some embodiments, the availability prediction output from the model 610 is used in the recommendation layer 612, which generates a recommendation 622 for the user based on the availability prediction. For example, if the vehicle availability prediction for the requested time and location is relatively low or unfavorable, the recommendation 622 may include a suggestion for an alternate time (e.g., 20 minutes later than the initially requested time) or vehicle location (nearby location) that has a more favorable availability prediction. If the availability prediction for the requested time and location is acceptable, the recommendation may be to keep that time and location. The recommendation 622 may be transmitted to the user device 602 via the interface 608 and the one or more networks 604.

Figure 7:
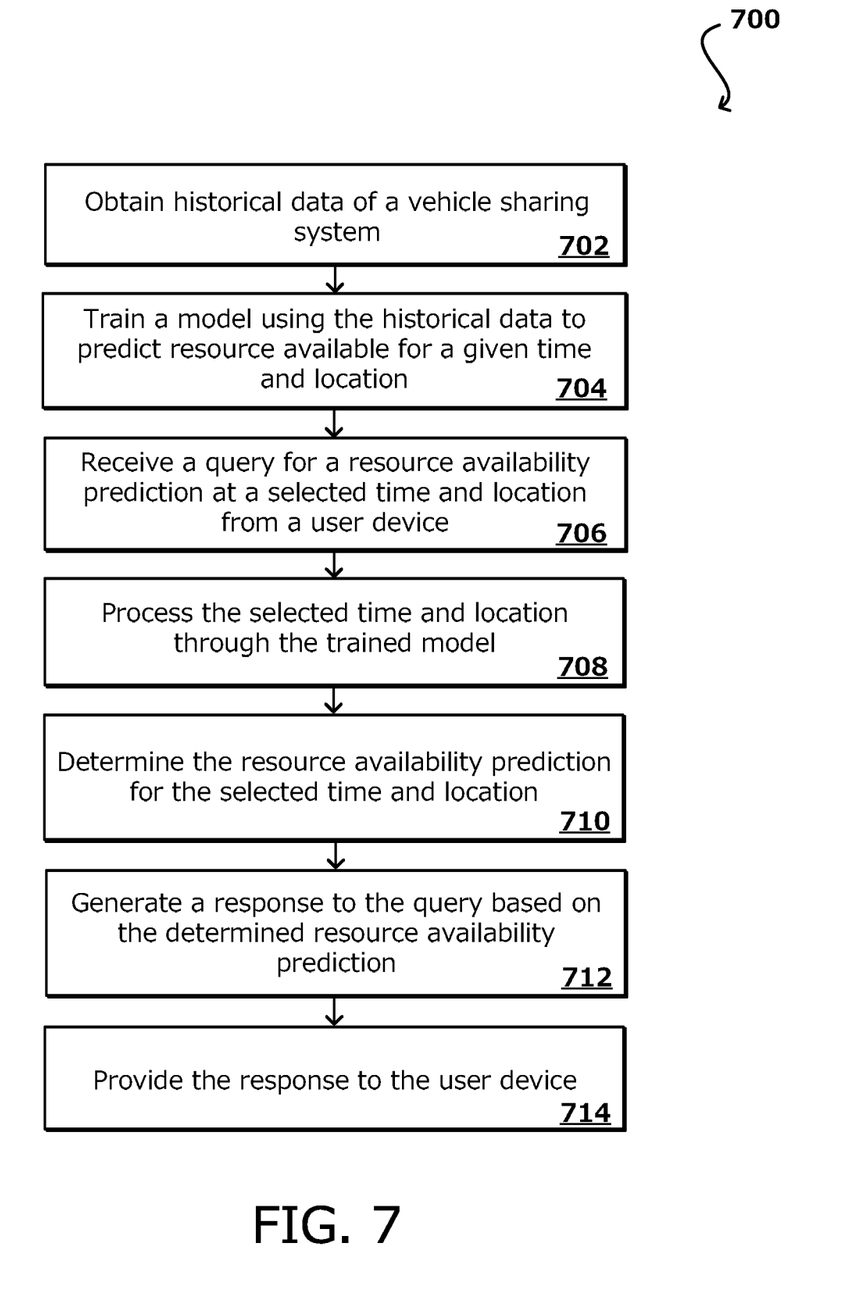
FIG. 7 illustrates an example process for predicting availability of a resource in a vehicle-sharing environment, in accordance with various embodiments of the present disclosure.

FIG. 7 illustrates an example process 700 for training and using a neural network for predicting availability of resources in a vehicle-sharing environment, in accordance with various embodiments. It should be understood that, for any process discussed herein, there can be additional, fewer, or alternative steps performed in similar or alternative orders, or in parallel, within the scope of the various embodiments. In this example, historical data collected from a vehicle sharing system is obtained 702 and used as training data to train 704 a neural network or other machine learning model. The vehicle sharing system may include a plurality of resources and the historical data includes data regarding resource availability data at respective times and locations. In some embodiments the historical data also includes contextual data associated with the respective times and locations, such as the weather, local events, among other environmental factors. In some embodiments, the vehicle sharing system includes a docked bicycle sharing system comprising a plurality of docking stations and a plurality of bicycles, and the queried location is associated with one or more docking stations. In some embodiments, the vehicle sharing system includes dockless bicycles having geolocation, processing, and networking capabilities. In such embodiments, the dockless bicycles may be located and movable throughout a plurality of geographic regions, and the query location is associated with one or more of the regions.

The neural network is trained 704 using the historical data to predict vehicle availability for a given time and location. Thus, after the neural network is trained, a query for a resource availability prediction may be received 706 from a user device. The query may include a current or future time and location. For example, the query may be generated when a user operating the user device selects a certain time and a certain location for which they'd like to check out a vehicle, and thus checks the availability prediction for that time and location. The queried time and location selected by the user are processed 708 through the trained neural network, which determines 710 the availability prediction for the queried time and location based on the historical data. In some embodiments, contextual data associated with the queried time and location is obtained and used in determining 710 the availability prediction. For example, there may be a sporting event happening at the queried time and location, which may affect the availability prediction. Specifically, the historical data may include records of bicycle utilization and/or availability during a similar sporting event and used in determining the present availability prediction. A response may then be generated 712 based on the determined availability prediction and provided 714 to the user device.

Figure 8:
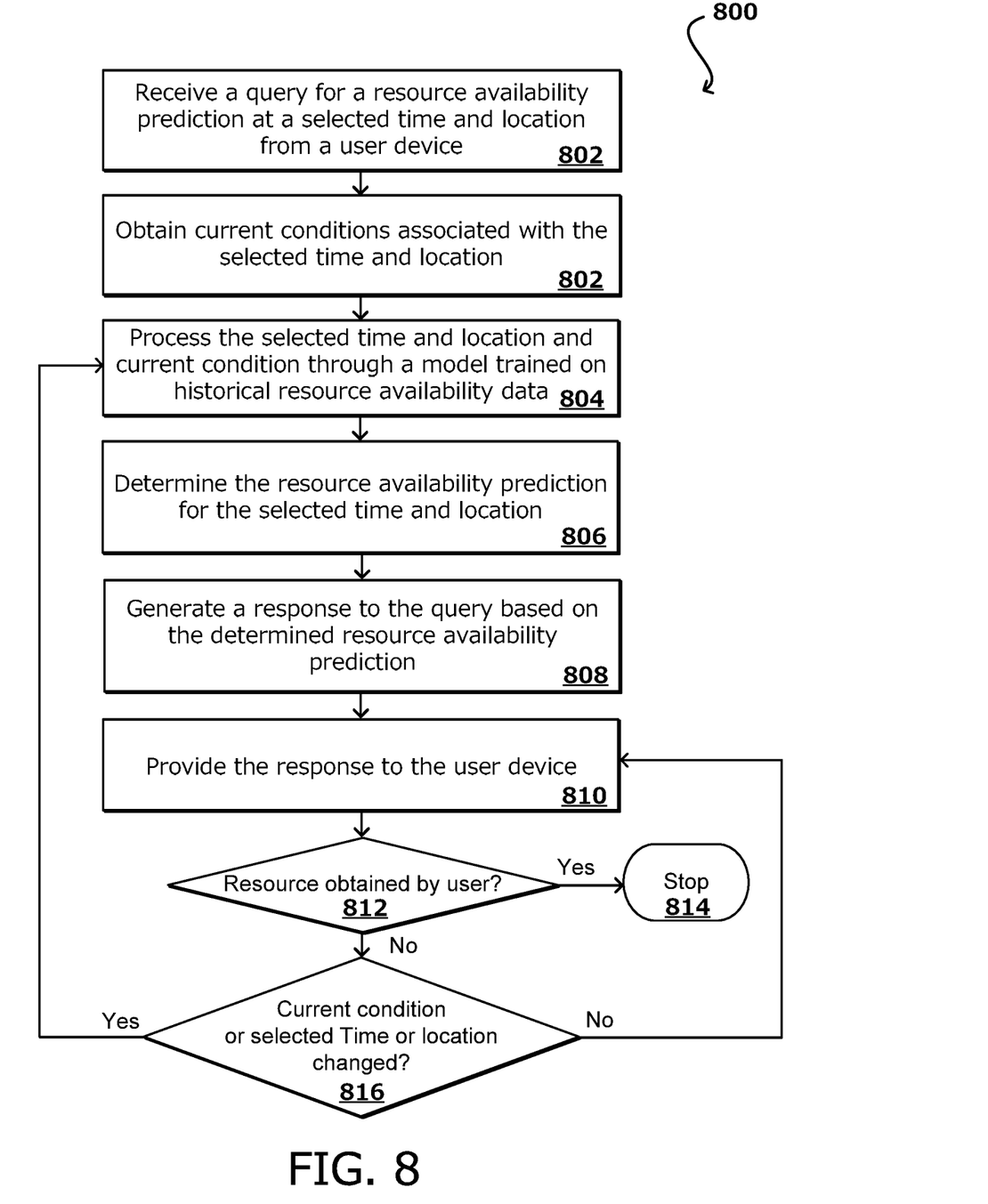
FIG. 8 illustrates an example process for predicting and updating availability of a resource in a vehicle-sharing environment, in accordance with various embodiments of the present disclosure.

FIG. 8 illustrates an example process 800 for predicting availability of parking in a vehicle-sharing environment, in accordance with various embodiments. In this example, a query for a resource availability prediction associated with a vehicle sharing system may be received 802, such as from a user device or generated based on a request from a user device. The query may include a current or future time and location for the availability prediction. For example, the query may be generated when a user operating the user device selects a certain time and a certain location for which they'd like to check out a vehicle, and thus checks the availability prediction for that time and location. In some embodiments, the query time may be determined based on the current location and time at which the query was initiated. An estimated travel time from the current location of the user and the selected location may be calculated and the time used for the actual query is the estimated travel time added to the current time. Thus, the resource availability prediction will be based on the time at which the user is expected to arrive at the location.

In various embodiments, the vehicle sharing system includes a plurality of vehicles of one or more types, an individual vehicle having either an available state or an unavailable state at a given time, and wherein the resource availability prediction includes a prediction of vehicle availability at the time and location. In some embodiments, the vehicle sharing system includes dockless bicycles having geolocation, processing, and networking capabilities. In such embodiments, the dockless bicycles may be located and movable throughout a plurality of geographic regions, and the query location is associated with one or more of the regions. In various embodiments, the vehicle sharing system includes a plurality of vehicle docking spots, in which an individual vehicle docking spot associated with one of a plurality of locations and having either an available state or an unavailable state at a given time. Thus, in such embodiments, the resource availability prediction may include a prediction of vehicle docking spot availability at the time and location. In various embodiments, the vehicle sharing system includes both vehicles and spots and the query may be for either or both vehicles and spot availability predictions.

The queried time and location selected by the user are processed 804 through a neural network trained to determine availability predictions based on an input time and location. Specifically, the neural network may be trained using historical data that includes resource availability data and statistics at respective times and locations in the past. Thus, using the neural network trained on the historical data, a resource availability prediction can be determined 806 for the selected time and location. In some embodiments, the historical data includes contextual data as describe above and contextual data for the queried time and location is also considered in determining the resource availability prediction. For example, contextual data may include weather, local events, season, day of the week, day of the year, holidays, news events, and any other factors associated with a particular time and location.

In some embodiments, current conditions may be used in determining the resource availability prediction. For example, a current condition may include a number of other queries for resource availability predictions for the same time and location may be received from other user devices. The number of other queries may be interpreted as a measure of present demand for resource at that time and location. Thus, the resources availability prediction may be determined based at least in part on the number of other queries received for that time and location. Similarly, there may be a number of other users currently enroute to the location with intention to utilize a resource of the plurality of resources based on behavior data associated with the users, and the resource availability prediction may be based at least in part on the number of users currently enroute. The intention to utilize a resource may be determine using various data. For example, a user may be currently utilizing a vehicle of the shared vehicle system and has entered the location as their destination, where they will likely dock their vehicle at a docking spot. The estimated arrival time may be determined. Thus, it may be interpreted that a vehicle will become available at the location at the estimated arrival time and a docking spot will become unavailable, which can affect the resource availability prediction.

Information may then be generated 808 based on the determined availability prediction and provided 810 to the user device to be presented to the user. In some embodiments, the information includes a likelihood score that at least one of the plurality of resources will be available at the time and location or an estimated number of resources of the plurality of resources that will be available at the time and location. In some embodiments, the information may include a recommendation for the user based on the resource availability prediction. For example, the recommendation may include an alternate nearby location or time window that is associated with a higher resource availability resource prediction, such as if the resource availability prediction for the originally queried time and location falls below a certain threshold. In various embodiments, it may be determined whether the user has successfully obtained the resource (e.g., bicycle, docking spot). If the user has obtained the resource, then the process may stop 814. If the user has not yet obtained the resource, then it is determined if a current condition or the selected time or location for obtaining the resource has changes. If none of those have changes, then the previously determined response is maintained and provided 810 to the user device. If, however, one of those has changed, then the new set of selected time and location and current condition are processed 804 through the model and a new response is generated 808 and provided 810 to the user device. Thus, the response provided to the user device regarding resource availability prediction can be constantly updated if any current condition changes or if the user changes the selected time or location.

Figure 9:
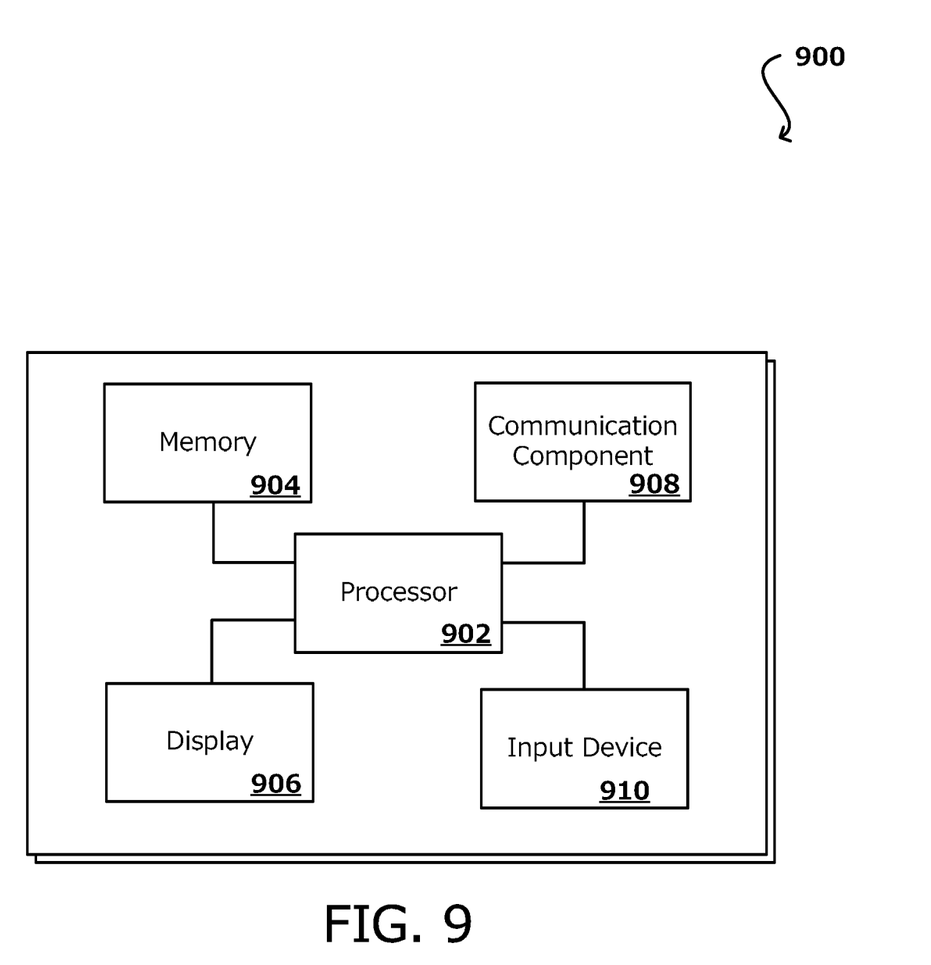
FIG. 9 illustrates a set of basic components of one or more devices of the present disclosure, in accordance with various embodiments of the present disclosure.

FIG. 9 illustrates a set of basic components of one or more devices 900 of the present disclosure, such as the user devices, bicycle station, and bicycles. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although the devices may output information via other means, such as through audio speakers. The device can include at least one communication component 908 that may enable wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, camera, microphone, keypad, scanner, detector, or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   obtain historical data collected from a vehicle sharing system, the vehicle sharing system comprising a plurality of vehicles comprising a first vehicle and a second vehicle, and the historical data including information for vehicle availability at respective times and locations;
   receive, from a user device, a query for vehicle availability information, the query including a time and a first location associated with vehicle pickup;
   determine, using the time and first location, vehicle availability information at the first location;
   provide the the vehicle availability information to the user device;
   determine that a user of the user device has retrieved the first vehicle from the first location based on the vehicle availability information; and
   as the first user is enroute to the first location to return the first vehicle;
   determine that there are no docking spots available at the first location;
   determine that a second user is scheduled to pick up the second vehicle from a second location,
   generate an updated docking spot availability information based at least in part on the second user picking up the second vehicle, the updated docking spot availability information indicating an availability of a docking spot at the second location; and
   provide the updated docking spot availability information to the user device.

2. The system of claim 1, wherein the instructions when executed further cause the system to:
   obtain contextual data associated with the time and first location, the contextual data including one or more of weather information, event information, seasonal information, day of the week information, day of the year information, holiday information, and news information, wherein the historical data includes contextual data associated with the respective times and locations; and
   determine the vehicle availability information based at least in part on the contextual data associated with the time and the first location.

3. The system of claim 1, wherein the vehicle sharing system includes a a plurality of docking stations comprising the docking spot, wherein the first location is associated with at least one of the plurality of docking stations other than the docking spot.

4. The system of claim 1, wherein the first and second vehicles are located and movable through a plurality of geographic regions, wherein the first location is associated with at least one of the plurality of geographic regions.

5. A computer-implemented method, comprising:
   receiving a query for vehicle availability prediction associated with a vehicle sharing system, the vehicle sharing system comprising a first vehicle and a second vehicle, the query including a time value and a first location;
   determining the vehicle availability information based at least in part on the time value and the first location;
   providing the vehicle availability information to a user device of the first user;
   determining that the first user has picked up the first vehicle form the first location; and
   as the first user is enroute to the first location to return the first vehicle;
   determining that there are no docking spots available at the first location to dock the first vehicle;
   determining that a second user is schedule to pick up the second vehicle from a second dock at a second location different from the first location;

determining an updated docking spot availability information based at least in part on the second user picking up the second vehicle;

providing the updated docking spot availability information to the user device causing the first user to go to the second location to park the first vehicle.

6. The computer-implemented method of claim 5, wherein the historical data includes contextual data associated with the respective times and locations, the method further comprising:

obtaining contextual data associated with the time value and the first location; and determining the vehicle availability based at least in part on the contextual data associated with the time value and the first location.

7. The computer-implemented method of claim 6, wherein the contextual data includes at least one of weather information, event information, seasonal information, day of the week information, day of the year information, holiday information, and news information.

8. The computer-implemented method of claim 5, wherein the first and second vehicles each have either an available state at a given time, and wherein the vehicle availability information includes a prediction of vehicle availability at the time value and the first location.

9. The computer-implemented method of claim 5, wherein the vehicle availability information includes an estimated number of vehicles available at a time indicated by the time value and the location.

10. The computer-implemented method of claim 5, further comprising:

determining a recommendation for the user based on the vehicle availability information, the recommendation including one of an alternate location or an alternate time that is associated with a higher vehicle availability.

11. The computer-implemented method of claim 5, further comprising:

receiving a plurality of queries from a plurality of devices for vehicle availability predictions for a same time as a time indicated by the time value and the first location;

determining a measure of present demand based at least in part on the plurality of queries; and determining the vehicle availability information based at least in part on the measure of present demand.

12. The computer-implemented method of claim 5, further comprising:

determining a location of the user device;

determining a travel time from the location to the first location; and determining the vehicle availability information based at least in part on the travel time.

* * * * *